United States Patent [19]

Murakami et al.

[11] 4,059,662
[45] Nov. 22, 1977

[54] METHOD OF MAKING IMMERSION NOZZLE AND LONG STOPPER FOR CONTINUOUS CASTING OF STEEL

[75] Inventors: Kazumasa Murakami, Nagoya; Takashi Natori, Osaka, both of Japan

[73] Assignee: Nippon Crucible Co., Ltd., Tokyo, Japan

[21] Appl. No.: 636,461

[22] Filed: Dec. 1, 1975

[30] Foreign Application Priority Data

Nov. 30, 1974 Japan .............................. 49-138739

[51] Int. Cl.$^2$ ............................................ C04B 33/34
[52] U.S. Cl. ....................................... 264/62; 106/56; 106/57; 264/63; 264/65
[58] Field of Search ............... 264/62, 63, 65; 106/56; 427/376 A; 428/384

[56] References Cited

U.S. PATENT DOCUMENTS

| | | | |
|---|---|---|---|
| 3,409,451 | 11/1968 | Zeitsch | 264/332 |
| 3,442,989 | 5/1969 | Hildebrandt | 264/63 |
| 3,702,771 | 11/1972 | Brown | 264/63 |
| 3,842,760 | 10/1974 | Parsons et al. | 106/56 |

*Primary Examiner*—Robert F. White
*Assistant Examiner*—John Parrish
*Attorney, Agent, or Firm*—Sughrue, Rothwell, Mion, Zinn and Macpeak

[57] ABSTRACT

A method of making an immersion nozzle or a long stopper, which comprises kneading 3 to 15% by weight of a binder capable of forming a carbon bond upon burning to decompose the binder in a reducing atmosphere with a granular material consisting of 48 to 82% by weight of zircon sand, 10 to 35% by weight of natural flake graphite and 1 to 8% by weight of silicon; molding the kneaded mixture using an isostatic press at a pressure of 500 to 1500 kg/cm$^2$; burning the molded product in a reducing atmosphere at a temperature of 900° to 1200° C; and applying a glassy coating to the outer surface of the burned product.

6 Claims, 1 Drawing Figure

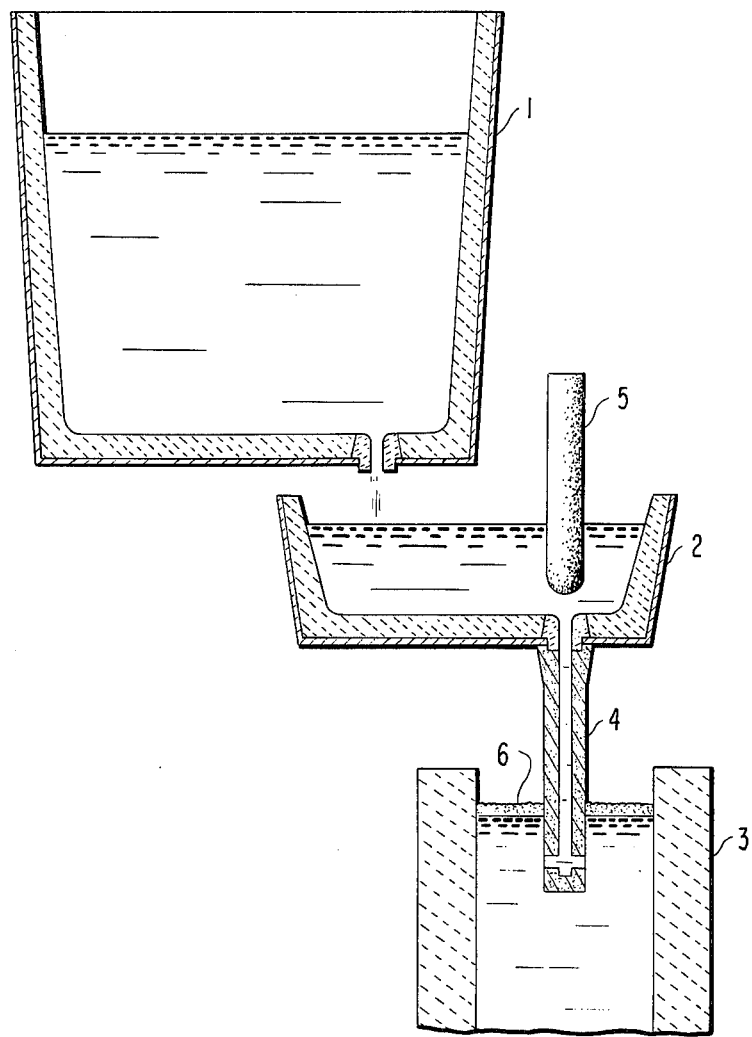

METHOD OF MAKING IMMERSION NOZZLE AND LONG STOPPER FOR CONTINUOUS CASTING OF STEEL

BACKGROUND OF THE INVENTION

1. Field of the Invention

This invention relates to a method of making an immersion nozzle and a long stopper used for the continuous casting of steel, and more specifically, to a method of making an immersion nozzle and a long stopper consisting mainly of natural flake graphite and zircon which provides especially good results when used for the continuous casting of high manganese steel.

2. Description of the Prior Art

An immersion nozzle is used for pouring molten steel into a mold from a receptacle such as a tundish. In use, the lower end of the nozzle is immersed in the molten steel within the mold to shield the molten steel from the air, to maintain the temperature of the flowing molten steel, and to prevent oxidation, disorder of the molten steel or the inclusion of a powdery coating agent sprayed onto the upper surface of the molten steel within the mold. Thus, it is an important device which is very effective to improve the quality of the cast product. Since it is used under very severe conditions and is very susceptible to corrosion or spalling due to the high temperature molten steel flow or slag, various refractory materials have previously been proposed for use as a material for immersion nozzles, for example, high silica-content immersion nozzles, and, more recently, fused silica, graphite-alumina, or zircon immersion nozzles.

A long stopper is provided inside the tundish, and serves to control the flow rate of the molten steel from the tundish over long periods of time. Hence, it requires the same properties as the immersion nozzle.

The prior art high silica immersion nozzzles have the defect that they are susceptible to corrosion by the molten steel, and the nozzle diameter increases during use. The fused silica immersion nozzles of the prior art have the advantage of superior resistance to spalling and to corrosion by the powdery coating agent. However, they are susceptible to corrosion by molten steel having a high manganese content, and when used for aluminum-killed steel, alumina deposits on the inside surface of the nozzle and tends to cause blockage of the nozzle. The graphite-alumina immersion nozzles of the prior art have high resistance to corrosion by molten steel, but undergo heavy corrosion due to the powdery coating agent and slag. The zircon-immersion nozzles of the prior art have high resistance to corrosion by the powdery coating agent and slag, but do not possess resistance to spalling. Moreover, when such a zircon immersion nozzle is used for aluminum-killed steel, it has the defect of clogging due to the deposition of alumina. Thus, none of the conventional immersion nozzles have proven entirely satisfactory.

SUMMARY OF THE INVENTION

Accordingly, it is an object of this invention to provide a method of making an immersion nozzle or a long stopper for the continuous casting of steel, high-manganese steel in particular, which comprises natural flake graphite and zircon bonded by a carbon bond with silicon added to strengthen the bonded portions, which retains the resistance to corrosion by slag, etc., characteristic of conventional zircon immersion nozzles, but which has increased mechanical strength as compared to conventional zircon immersion nozzles, and which is free from the defects of conventional zircon immersion nozzles such as poor spalling resistance and deposition of alumina.

BRIEF DESCRIPTION OF THE DRAWING

The FIGURE is a schematic view illustrating a continuous casting process.

DESCRIPTION OF PREFERRED EMBODIMENTS

According to this invention, there is provided a method of making an immersion nozzle or a long stopper, which comprises kneading 3 to 15% by weight of a binder capable of forming a carbon bond by burning in a reducing atmosphere with a granular material consisting of 48 to 82% by weight of zircon sand, 10 to 35% by weight of natural flake graphite and 1 to 8% by weight of silicon; molding the kneaded mixture in an isostatic press at a pressure of 500 to 1500 kg/cm$^2$; burning the molded product in reducing atmosphere at a temperature of 900° to 1200° C; and applying a glassy coating to the outer surface of the burned product.

The attached FIGURE is a schematic view illustrating the principles of continuous casting. Numeral 1 is a ladle comprising a steel outer surface and a refractory material inner lining; numeral 2 is a tundish comprising a steel outer surface and a refractory material inner lining; numeral 3 is a casting mold; numeral 4 is an immersion nozzle; numeral 5 is a long stopper; and numeral 6 is a powdery coating material.

At molding, pressure from the lateral surfaces of the material causes the natural flake graphite to be arranged generally coaxial to the axis of the nozzle and in its circumferential direction. As a result, the strength of the nozzle, especially its bending strength along its axial direction, increases remarkably. In addition, the graphite material serves to inhibit the penetration of molten steel or slag or a powdery coating agent and to prevent the deposition of alumina. Further, since the graphite imparts a suitable heat conductivity to the nozzle, its resistance to spalling is increased.

The raw materials for the immersion nozzle or long stopper of this invention will now be described in detail.

The zircon material is naturally occurring zircon sand which preferably contains at least 95% by weight of zircon (ZrSiO$_2$). The amount of the zircon sand is 48 to 82% by weight. When the amount of the zircon sand is less than 48%, the resulting immersion nozzle has poor resistance to corrosion by a powdery coating agent, and when it is above 82%, the resistance to spalling becomes poor. Preferably, the zircon sand is used as a mixture of particles with a size of 590 to 44 microns and particles with a size of less than 44 microns in a weight ratio of 35–55 : 45–65.

The natural flake graphite preferably contains ash in an amount of less than 15%. The amount of the natural flake graphite is 10 to 35% by weight. When the amount is less than 10%, suitable heat conductivity cannot be obtained, and the resulting product has poor resistance to spalling. Furthermore, the deposition of alumina cannot be prevented. On the other hand, when the amount is above 35%, the strength of the burned product is insufficient. Furthermore, the thermal conductivity of the product is too high, and the temperature of the molten steel tends to decrease. As a result, the deposition of steel or alumina occurs. It is necessary that the natural flake graphite contain at least 70% of particles having a size of 500 to 74 microns. When it contains large amounts of coarse particles having a size of above 500 microns, the dispersibility of the graphite becomes poor and its effect is reduced. On the other hand, when it contains large amounts of fine powders having a size of less than 74 microns, the resulting product has poor resistance to spalling.

When silicon powder is added to a carbon-bonded refractory material, it reacts with the carbon at a relatively low temperature, e.g., about 1,150° C., to form silicon carbide and thus to increase the strength of the refractory material. The matallic silicon used in this invention has an Si content of at least 90% and a particle diameter of not more than 74 microns. Its amount is 1 to 8% by weight of the granular material. When the amount is less than 1%, no increase in strength can be obtained, and when it is above 8%, the metallic silicon partly remains unreacted to reduce the heat resistance of the product.

The granular materials must be bonded by a carbon bond in order to increase their resistance to corrosion by slag and the powdery coating agent. When a binder containing alumina, such as clay, is used, silica in the zircon sand and alumina in the clay react with each other to form mullite which heavily corrodes the bonded parts. Any binder can be used which provides carbon upon burning in a reducing atmosphere and thus forms a carbon bond. Preferably, the binder imparts the desired flowability to the powdery materials during molding. Examples of such binders are coal or petroleum tars and pitch, phenolic resins, and furan resins. A suitable amount of the binder is 3 to 15% by weight. When the amount is less than 3%, the form retention of the product after molding is insufficient, and when it exceeds 15%, cracks occur during molding.

The above granular materials are thoroughly mixed, and then kneaded well with the binder in liquid and/or powder form. The kneaded mixture is placed in a rubber mold, and press-formed by means of an isostatic press. This press-forming causes the natural flake graphite to be generally arranged in a coaxial direction to the axis of the cylindrical product and in its circumferential direction.

The molded product is placed in a refractory receptacle, and after surrounding it with coke particles, is burned in the reducing atmosphere resulting from the coke.

In actual use, it is desirable to apply a coating, such as a glassy coating, to prevent the oxidation and combustion of the graphite at those parts of the resulting product which are exposed to the atmosphere. Any glass coating material which softens and melts at a temperature of 700° C to 1100° C can be used.

The following Examples are to illustrate the present invention in greater detail without limiting the same. In these examples, all percentages are by weight.

EXAMPLE 1

80% of zircon sand, 13% of natural flake graphite and 2% of silicon were thoroughly mixed, and the mixture was kneaded well with 5% of a phenolic resin. The kneaded mixture was filled in a rubber mold of a predetermined size and shape, and molded at 1,500 Kg/cm² using an isostatic press in accordance with a predetermined schedule to form an immersion nozzle having a size of 150 mm (outer diameter) × 50 mm (inner diameter) × 900 mm (length). The molded product was burned in a reducing atmosphere after placing it in a refractory receptacle and filling coke particles around it.

EXAMPLE 2

70% of zircon sand, 16% of natural flake graphite and 5% of silicon were thoroughly mixed, and the mixture was kneaded well with 9% of a phenolic resin. The kneaded mixture was placed in a rubber mold of a predetermined size and shape, and molded at a pressure of 1,000 Kg/cm² using an isostatic press in accordance with a predetermined schedule to form an immersion nozzle having the same size as that in Example 1. The molded product was burned in a reducing atmosphere in the same manner as in Example 1.

EXAMPLE 3

50% of zircon sand, 31% of natural flake graphite and 7% of silicon were thoroughly mixed, and the mixture was well kneaded with 12% of a phenolic resin. The kneaded mixture was placed in a rubber mold of a predetermined size and shape, and molded at pressure of 700 Kg/cm² in accordance with a predetermined schedule to form a long stopper having a size of 130 mm (outer diameter) × 700 mm (length). The molded product was burned in a reducing atmosphere in the same manner as in Example 1.

The immersion nozzles and long stoppers obtained in Examples 1, 2 and 3 and a graphite-alumina immersion nozzle for comparison were each tested for the properties indicated in the following table.

The amount of corrosion was tested as follows: rod-like test specimens with a trapezoidal cross section were combined to form a receptacle with a polygonal cylindrical interior. High manganese steel and a powdery coating agent were placed therein and heated and melted in a high frequency furnace. After maintaining the test specimens in this state for a predetermined period of time, the amounts of corrosion of the test specimens at parts contacted with the molten metal and contacted with the coating agent were measured.

The results are tabulated in Table 1.

TABLE 1

| Properties | Example 1 | Example 2 | Example 3 | Comparison (graphite-alumina) |
|---|---|---|---|---|
| Apparent density (g/cm³) | 3.60 | 3.55 | 3.02 | 2.97 |
| Bulk density (g/cm³) | 3.16 | 2.94 | 2.77 | 2.43 |
| Porosity (%) | 15.4 | 16.5 | 17.8 | 18.4 |
| Compression strength (Kg/cm²) | 225 | 230 | 205 | 200 |
| Bending strength (Kg/cm², at room temperature) | 80 | 97 | 86 | 69 |
| Bending strength (Kg/cm², at 1400° C) | 92 | 103 | 95 | 57 |
| Amount of corrosion at portion contacted with molten steel (mm) | 1.0 | 0.9 | 0.6 | 0.8 |
| Amount of corrosion at portion contacted with coating agent (mm) | 3.8 | 4.2 | 5.8 | 13.4 |

It can be seen from the above table that the immersion nozzles and long stoppers in accordance with this invention were substantially the same as the comparison graphite-alumina immersion nozzle in regard to corrosion loss due to corrosion by the high manganese steel, but that in regard to corrosion loss by the powdery coating agent, they showed a corrosion loss about ⅓ to ½ of that of the graphite-alumina immersion nozzle.

When high manganese steel was cast using the immersion nozzles in accordance with this invention, the loss due to corrosion by the powdery coating agent was reduced, and the immersion nozzles did not break at portions contacted with the powdery coating agent. The immersion nozzles could withstand use for a period several times longer than the conventional graphite-alumina immersion nozzle.

While the invention has been described in detail and with reference to specific embodiments thereof, it will be apparent to one skilled in the art that various changes and modications can be made therein without departing from the spirit and scope thereof.

What is claimed is:

1. A method of making an immersion nozzle or a long stopper, which consists essentially of 3 to 15% by weight of a binder capable of forming a carbon bond upon burning to decompose the binder in a reducing atmosphere, 48 to 82% by weight of zircon sand, 10 to 35% by weight of natural flake graphite and 1 to 8% of silicon containing at least 90% silicon and having a particle diameter of not more than 74 microns, said process comprising the steps of kneading the binder with the zircon sand, graphite and silicon, molding the kneaded mixture in an isostatic press at a pressure of 500 to 1500 kg/cm$^2$, burning the molded product in a reducing atmosphere at a temperature of 900° to 1200° C and applying a glassy coating to the outer surface of the burned product.

2. The process of claim 1 wherein in said burning step the molded product is placed in a refractory receptacle and surrounded with coke particles and said reducing atmosphere results from said coke during the burning.

3. The process of claim 1 wherein said glassy coating is a glass material which softens and melts at a temperature of 700° to 1100° C.

4. The method of claim 1, whrein the zircon sand contains at least 95% of zircon ($ZrSiO_2$), and is a mixture of particles having a size of 590 to 44 microns and particles having a size of less than 44 microns in a weight ratio of 35-55 : 45-65.

5. The method of claim 1, wherein the natural flake graphite has an ash content of less than 15%, and contains at least 70% of flakes having a size of 500 to 74 microns.

6. The method of claim 1, wherein the binder capable of forming a carbon bond upon burning in a reducing atmosphere is a coal or petroleum tar or pitch, a phenolic resin or a furan resin.

* * * * *